United States Patent [19]

Hughes

[11] 4,195,914

[45] Apr. 1, 1980

[54] MIRROR ARRANGEMENT WITHIN AN EVACUATED SPACE FOR ACCURATELY FOCUSSING A LARGE DIAMETER, HIGH POWER LASER BEAM

[75] Inventor: John L. Hughes, Aranda, Australia

[73] Assignee: Quentron Optics Pty. Limited of c/-Stephen Su & Co., Adelaide, Australia

[21] Appl. No.: 930,319

[22] Filed: Aug. 2, 1978

[30] Foreign Application Priority Data

Aug. 5, 1977 [AU] Australia ............................. PD1116

[51] Int. Cl.² ............................................. G02B 5/10
[52] U.S. Cl. ............................................. 350/294
[58] Field of Search .............. 350/294, 293, 299, 296, 350/55, 27; 356/301

[56] References Cited

U.S. PATENT DOCUMENTS

| 2,628,533 | 2/1953 | Oetjen ................................... 350/294 |
| 3,825,325 | 7/1974 | Hartley et al. ....................... 350/299 |
| 4,017,163 | 4/1977 | Glass ..................................... 350/294 |
| 4,084,887 | 4/1978 | Sigler .................................... 350/294 |
| 4,089,595 | 5/1978 | Simmons et al. ................... 350/294 |

FOREIGN PATENT DOCUMENTS 190616 of 1967 U.S.S.R. ................................... 350/294

Primary Examiner—Jon W. Henry

[57] ABSTRACT

An evacuated chamber utilizing an arrangement of three mirrors for accurately focussing a large diameter, high power pulsed laser beam or continuous wave laser beam either in a small focal volume or onto the surface of a target placed inside the chamber is described. The invention enables the production of an intense photon distribution within a center-of-momentum region or the uniform irradiation of laser fusion pellets.

4 Claims, 3 Drawing Figures

MIRROR ARRANGEMENT WITHIN AN EVACUATED SPACE FOR ACCURATELY FOCUSSING A LARGE DIAMETER, HIGH POWER LASER BEAM

FIELD OF THE INVENTION

This invention relates to an arrangement of three mirrors within an evacuated space for accurately focussing a large diameter, high power, pulsed or continuous wave beam.

DESCRIPTION OF THE PRIOR ART

As laser technology has advanced since the advent of the laser in 1960, it has become clear this technology can provide an experimental tool in scientific research which allows for the controlled creation of two states of matter in a manner that has not yet proved to be feasible using any other form of technology. These two states of matter are:

(a) A dense distribution of low energy laser photons, each of about 1 electron volt energy, whose energy density exceeds $10^{14}$ ergs cm$^{-3}$ and whose volume can be less than $10^{-8}$cm$^3$. Such a photon distribution can either be formed by focussing a single laser beam, or laser pulse, or it can be formed by superimposing two equal but oppositely directed laser beams or laser pulses into a common focus region of about $10^{-8}$cm$^{-3}$.

(b) A pellet of a material containing one or more elements which has been compressed to very high densities of greater than 100 grams cm$^{-3}$ via an implosion process resulting from the effect of converging laser beams or laser pulses ablating the outer portion of the pellet in such a manner that its central position is compressed.

These two forms of dense matter, one in the form of photons of radiation, the other in the form of particles (electrons and ions of various elements) provide new avenues of research which have not previously been available for study under controlled laboratory conditions.

To fully exploit these two new configurations of matter, it is necessary to be able to accurately focus very powerful laser beams in the range $10^{12}$ watts peak power to $10^{15}$ watts peak power. Such power levels imply large diameter beams of up to several meters.

Prior art systems used to focus laser beams, if less than 20 cms diameter, incorporated lenses or a combination of lenses and concave mirrors to focus intense laser beams in laser fusion studies. However, as the diameter and intensity of laser beams increase, it becomes progressively more difficult to accurately focus the laser beams due to both the size of the lenses required and the fact that because they are transmissive optical components they introduce beam distortion which in turn can drastically affect the quality of the focussed laser beam.

SUMMARY OF THE INVENTION

An important object of the present invention is to provide a simple arrangement for accurately focussing large diameter high power pulsed or continuous wave laser beams which avoids the aforesaid drawbacks.

The present invention provides an arrangement in which lenses have been eliminated. The focussing of the laser beam is achieved using one plane and two concave, optically polished components with appropriate mirror surfaces which, for example, can be metallic or dielectric layers as are well-known in the art.

In a particular form this invention relates to an arrangement utilizing three mirrors of accurately focussing a large diameter, high power, pulsed or continuous wave laser beam either into a small volume of about $10^{-8}$cm$^3$, inside an evacuated chamber with one or more optically polished windows through which the laser beam enters and leaves the chamber or onto the surface of a target inside an evacuated chamber.

DESCRIPTION OF THE DRAWINGS

Details of the invention will become clearer from a consideration of the ensuing description taken in conjunction with the drawings. It is emphasised that the drawings are illustrative of the preferred embodiment.

DETAILED DESCRIPTION

Figure 1:
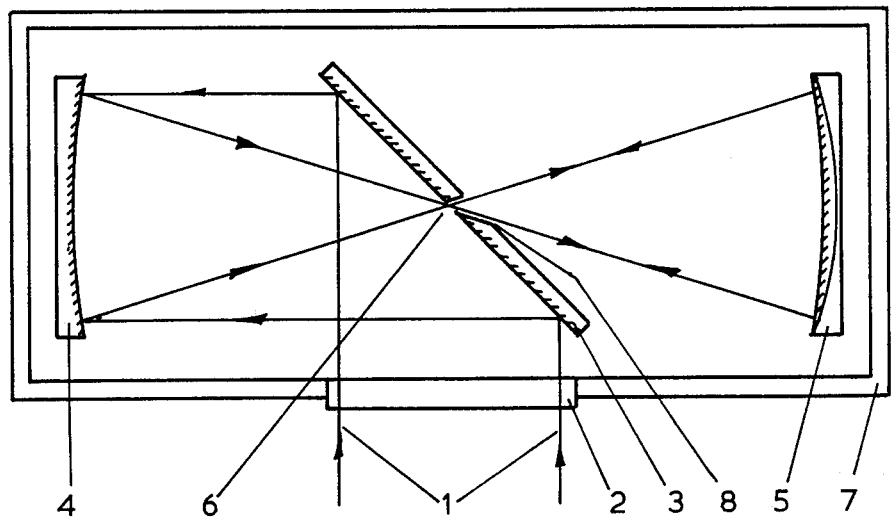
FIG. 1 shows a three mirror arrangement according to the invention for achieving a dense photon distribution or for the irradiation of a pellet target placed in a common focus.
Figure 2:
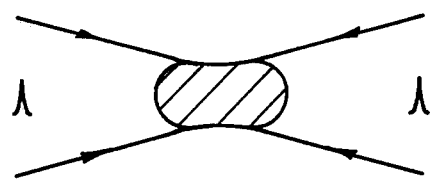
FIG. 2 shows the formation of an optical centre-of-momentum region (shaded area) formed by superimposing two equal but oppositely directed laser pulses into a common focus volume.

The invention in the configuration shown in FIG. 1 can focus large diameter laser beams to achieve very high photon flux densities, within an optical centre-of-momentum region, FIG. 2, inside an evacuated chamber. The chamber is evacuated to a very low pressure, preferably $10^{-4}$ torr. In this configuration of the invention, a large diameter (10 to 100 cms or more) laser output beam (1) is reflected by the flat reflector (mirror) (3) after it has entered the evacuated chamber (7) via the optically polished window (2). After being reflected by the flat reflector (mirror) (3) the laser beam is directed onto the concave reflector (mirror) (4) so as to focus (6) and pass through hole (8) in reflector (mirror) (3) before diverging to strike the second concave reflector (mirror) (5) which directs the laser beam back along its path of incidence towards the laser beam source via window (2).

The chamber (7) may be cylinder more than 1 meter in diameter and desirably more than ten meters long. The mirrors (4) and (5) are 10 to 100 cms or more in diameter and the flat reflector (3) may be square with sides 15 to 150 cms or more. The reflectors (4) and (5) may have a thickness about 10% of their diameter and the reflector (3) a similar thickness.

The focus volume (6) provides an intense photon distribution within a centre-of-momentum region due to the fact that equal number of photons can be directed through (8) from opposite directions (FIG. 2). In the case of a continuous wave laser beam this is a simple process to achieve due to the fact that one merely needs to return the laser beam along its path of incidence. On the other hand, with a pulsed laser beam at least two pulses are required, separated from each other in time so that the first pulse returns through the focus (6) as the second pulse enters the focus (6) for the first time. Photon number densitites corresponding to over $10^{15}$ ergs cm$^{-3}$ can be realised with the present invention with a laser output pulse train consisting of two pulses whose peak powers are in the range $10^{12}$ watts to $10^{15}$ watts.

Such photon densities are required to assess photon-particle and photon-photon interaction physics. The configuration of the invention shown in FIG. 1 can be used for the two beam generation of a dense photon distribution (6) (FIG. 2) or the irradiation of a pellet target placed in the common focus (6) provided both concave reflectors are identical and the rear surface of the flat reflector (3) is identical to its front surface. The second beam from a two beam laser would then have to enter the evacuated chamber through a second window identical to (2) but on the other side of (3).

Figure 3:
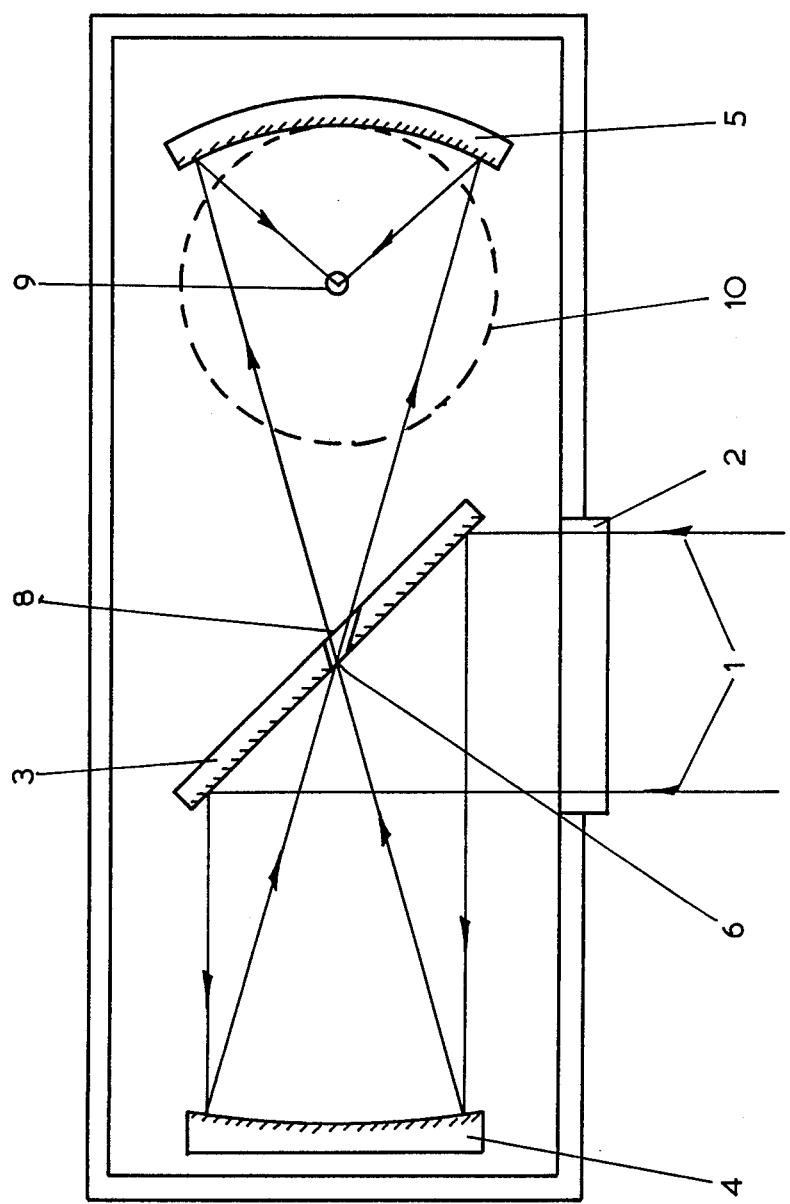
FIG. 3 shows a three mirror arrangement according to the invention for uniformly irradiating a laser fusion pellet utilising a tetrahedral geometry.

The present invention can also be used to uniformly irradiate laser fusion pellets or similar targets. The laser fusion pellet (9) of FIG. 3 can be irradiated, for example, by four identical laser beams in the manner of FIG. 3 in a tetrahedral geometry. Such a tetrahedral pellet irradiation geometry can best be considered from the viewpoint of this invention in terms of any one of the four beams of FIG. 3. Here, a single pulse output from a laser source (not shown) is reflected off the plane mirror (3) after entering the evacuated chamber (7) via the optically polished window (2). Concave mirror (4) focusses (6) the laser pulse through a small hole (8) in the flat reflector (3) so that it can diverge onto the surface of the concave reflector (5) which in turn focusses the pulse onto the surface of the pellet target (9). The broken lines (10) of circular form notutionally outline the perimeter of the cross-section of the surface of the sphere over which four concave reflectors (5) are arranged to achieve uniform spherical irradiation of the pellet (9) in a four beam tetrahedral irradiation geometry. It should be noted that the required distribution of the four units of the present invention around the spherical surface (10) provides adequate access to the laser fusion pellet (9) under conditions in which it (9) can be irradiated with a high degree of uniformity. It should also be noted that the hole (8) in the flat reflector (3) creates a gap in the centre of the laser beam which can be adjusted to be of such a size that no radiation impinges onto the pellet (9) as the laser beam diverges onto reflector (5) prior to being focussed onto the pellet (9).

It is reiterated that the foregoing description of preferred embodiments is not restrictive of the board scope of this invention.

I claim:

1. An arrangement of three mirrors comprising two concave end mirrors and a flat central mirror within an evacuated chamber, such that a laser beam containing two or more pulses entering the chamber through an optically polished window, the said laser beam being incident on the optically flat central mirror, orientated at 45° to the central axis of the three mirror system, which reflects the incident beam onto the concave surface of one of the end mirrors such that the laser beam focusses in an aperture in the centre of the flat mirror and diverges onto the surface of the second said end mirror which in turn refocusses the laser beam along the central axis so that it may overlap with the first focus region in the aperture in the flat mirror at various positions along the said central axis of the three mirror system.

2. An arrangement of three mirrors as claimed in claim 1 where the two concave end mirrors range from 10 cm to 100 cms in diameter and the plane mirror is a square configuration with sides ranging from 15 to 150 cms.

3. An arrangement of three mirrors as claimed in claim 1 wherein a single laser pulse input is focussed by the second said concave mirror onto a portion of the surface of a pellet positioned along the central axis of the three mirror system between the said planar mirror and the second said concave mirror.

4. An arrangement of four of the mirror arrangements claimed in claim 3 wherein said second concave end mirror of each arrangement is positioned to achieve uniform spherical irradiation of a pellet in a four beam tetrahedral irradiation geometry.

* * * * *